United States Patent Office 2,752,400
Patented June 26, 1956

2,752,400

METHOD FOR PREPARING PHENYLTRIFLUORO-ETHYLENE

Maurice Prober, Schenectady, N. Y., assignor to General Electric Company, a corporation of New York No Drawing. Application June 26, 1953,
Serial No. 364,474

1 Claim. (Cl. 260—651)

This application is a continuation-in-part of my earlier application, Serial No. 143,152, filed February 8, 1950, now Patent No. 2,651,627, and assigned to the same assignee as the present invention.

This invention relates to the production of new materials and more particularly is concerned with preparing phenyl trifluoroethylene. This monomer has valuable and useful properties that make it especially suitable for use, for example, in molding, laminating, casting, coating and adhesive applications and for other purposes.

Various methods may be employed to prepare the phenyl trifluoroethylene with which the present invention is concerned. One method which I have found to be satisfactory comprises reacting benzene with chlorotrifluoroethylene. This reaction is preferably conducted at an elevated temperature of the order from about 350 to 700° C. in the vapor phase. Distillation of the reaction product may thereafter be employed to obtain phenyl trifluoroethylene.

A specific method for preparing the phenyl trifluoroethylene comprises heating a mixture of ingredients comprising chlorotrifluoroethylene and benzene at elevated temperatures for times varying from about 1 to 6 or more hours. Whatever method is employed, whether reaction is conducted in the vapor phase at atmospheric or superatmospheric pressures, I have found it advantageous for accelerating the reaction to use various acidic substances such as, for example, boron trifluoride, boron trifluoride etherates, hydrogen fluoride, antimony trifluoride, dehydrated phosphoric acid; metals and alloys, e. g., copper, silver, etc.; metal halides, for instance, copper chloride, silver chloride, copper bromide, silver fluoride, etc.; and substances having high specific active surfaces, such as activated carbon, alumina, silica gel, etc. Ordinarily when employing catalysts in the reaction, it is desirable to deposit the catalyst if the physical state of the catalyst permits it, on an inert or even an active carrier such as carbon pellets, silica gel, alundum particles, etc.

The proportions of essential ingredients, namely, the benzene and chlorotrifluoroethylene may be varied widely. Advantageously, essentially molecular equivalents of the benzene and chlorotrifluoroethylene are employed. However, it will be apparent to those skilled in the art that higher or lower proportions of the benzene or of the chlorotrifluoroethylene are not precluded. The amount of time required for effecting reaction may, of course, be varied widely depending upon conditions such as the proportions of benzene and chlorotrifluoroethylene, the temperature at which the reaction is carried out, the presence or absence of a catalyst, whether the passage of the benzene and chlorotrifluoroethylene is on a continuous basis, etc.

The phenyl trifluoroethylene thus obtained may be polymerized separately or mixed with other polymerizable materials and interpolymerized therewith. Thus, the phenyl trifluoroethylene can be interpolymerized with at least one other organic compound copolymerizable with the fluorinated styrene and containing a polymerizable —CH=C< grouping, for example, styrene, vinyl acetate, methyl acrylate, ethyl acrylate, diethyl maleate, etc. For purposes of accelerating the polymerization of the copolymerization, one may use various catalysts including benzoyl peroxide, lauroyl peroxide, etc. The concentration of polymerization catalyst may be varied widely but in general will range from about 0.1 to 4 per cent, by weight, of the whole mixture. In carrying out the polymerization with phenyltrifluoroethylene, temperatures of the order of from about 20 to 30° to as high as 100 to 130° C. are advantageously employed and ordinarily temperatures within the range of 40° to 120° C. are optimum for effecting desirable polymerization.

The homopolymer of phenyltrifluoroethylene has a relatively high softening point and ranges around 180° C. when the monomer is polymerized in bulk and has a softening point of the order of about 240° C. when polymerized by means of an emulsion polymerization. The homopolymer of phenyl trifluoroethylene has considerably reduced flammability over non-fluorinated polystyrene.

In order that those skilled in the art may better understand how the present invention may be practiced, the following examples are given by way of illustration and not by way of limitation. All parts are by weight.

Example 1

A mixture of 56 parts benzene and 69 parts chlorotrifluoroethylene was passed through a heated tube maintained at a temperature of from 572–602° C. over a two hour period. The reaction product was condensed in a water-cooled condenser and in a Dry Ice trap. The Dry Ice trap concentrate was allowed to evaporate at room temperatures, leaving a small residue which was combined with a larger fraction (about 78.3 parts) of reaction product condensed in the water-cooled condenser. The reaction product was then diluted with ether to reduce mechanical losses, washed with dilute KOH and water, and dried over anhydrous calcium chloride. The drying agent was removed and the remaining reaction product fractionally distilled at atmospheric pressure to yield phenyl trifluoroethylene having a boiling point of 133–136° C. at atmospheric pressure. Analysis of this monomeric material showed that it contained 61.2 per cent carbon and 3.4 per cent hydrogen (theoretical carbon: 60.77 per cent; hydrogen: 3.19 per cent).

Example 2

Through a Pyrex glass tube which was heated at a temperature of about 540 to 560° C. (which tube was followed by a trap with a water-cooled condenser and two Dry Ice traps) was metered a mixture of chlorotrifluoroethylene and benzene. The chlorotrifluoroethylene and the benzene were introduced simultaneously into the heated tube at a constant rate so that in a period of 4½ hours there was introduced through the heated tube 234 parts chlorotrifluoroethylene and 117.9 parts benzene. As a result of this reaction, there was obtained 163.6 parts of reaction product in the first trap and 172.6 parts product in the two Dry Ice traps. The condensate obtained in the Dry Ice traps was allowed to distill through a potassium hydroxide solution, and the residue from this distillation was combined with the higher boiling reaction product (from the first trap), diluted with methylene chloride to reduce mechanical loss, washed with 2 percent potassium hydroxide, dried and rectified through a glass helix packed column to yield about 8.4 parts phenyl trifluoroethylene together with unreacted benzene and chlorotrifluoroethylene.

Example 3

In this example, benzene and chlorotrifluoroethylene were passed together through a heated tube maintained at a temperature of about 550° C. for a period of about 4½ hours employing the same kind of apparatus and condition as described above in Example 2. The only exception was that during the passage of the mixture of chlorotrifluoroethylene and benzene (which comprised 245 parts chlorotrifluoroethylene and 121.6 parts benzene), there was also passed through at the same time, intimately mixed with the chlorotrifluoroethylene and benzene, small amounts of boron trifluoride. The total amount of boron trifluoride passed through the heated tube during this period on a substantially constant basis represented about 0.06 mol or 4 mol percent $BF_3$, based on the benzene passed through. As a result of this reaction, there was obtained 176.6 parts reaction product condensed in the water-cooled trap and 162.9 parts of product condensed in the Dry Ice traps. These ingredients were rectified to give the following relatively pure fractions; (1) 50.7 parts benzene; (2) 13.6 parts phenyltrifluoroethylene; boiling at 66.2–69.1° C. at 70.5 mm.; and (3) 93.6 parts chlorotrifluoroethylene.

It will be clearly apparent that the presence of the boron trifluoride catalyst, exerted a beneficial effect by increasing the yield of phenyl trifluoroethylene under essentially identical conditions. Thus, it can be seen that the catalyst, namely, the boron trifluoride increased the yield 32% (based on reacted chlorotrifluoroethylene) and 18% (based on the benzene). Obviously, the unreacted materials, specifically the benzene and chlorotrifluoroethylene can be recycled in such a process to give additional yields of phenyl trifluoroethylene.

The phenyl trifluoroethylene herein described may be used to impregnate and coat various fillers or sheet materials, and may hereafter be polymerized in situ by suitable means preferably using heat and a catalyst under varied conditions of temperature and pressure. If desired, the monomer may be polymerized beforehand, dissolved in a suitable solvent, and the various fillers and sheet material thereafter treated with the solution and the solvent moved by suitable means. It is thus possible to prepare compositions useful in various molding applications, or to impregnate sheet materials with the monomer, which can be superposed upon each other and molded under heat and pressure to yield laminated panels having utility in applications requiring good heat stability and electrical properties.

What I claim as new and desire to secure by Letters Patent of the United States is:

The method of preparing phenyl trifluoroethylene which comprises effecting reaction between benzene and chlorotrifluoroethylene at a temperature of from about 350–700° C. in the presence of boron trifluoride.

References Cited in the file of this patent

UNITED STATES PATENTS 2,485,017     Schmerling              Oct. 18, 1949